(12) United States Patent
Zhang et al.

(10) Patent No.: US 9,391,875 B2
(45) Date of Patent: Jul. 12, 2016

(54) RESOURCE ORIENTED DEPENDENCY GRAPH FOR NETWORK CONFIGURATION

(71) Applicant: Fujitsu Limited, Kanagawa (JP)

(72) Inventors: Qiong Zhang, Plano, TX (US); Paparao Palacharla, Richardson, TX (US); Chengyi Gao, Richardson, TX (US); Xi Wang, Murphy, TX (US); Motoyoshi Sekiya, Richardson, TX (US)

(73) Assignee: Fujitsu Limited, Kawasaki-shi (JP)

( * ) Notice: Subject to any disclaimer, the term of this patent is extended or adjusted under 35 U.S.C. 154(b) by 138 days.

(21) Appl. No.: 13/764,604

(22) Filed: Feb. 11, 2013

(65) Prior Publication Data

US 2014/0225896 A1    Aug. 14, 2014

(51) Int. Cl.
*H04L 12/707* (2013.01)
*H04L 12/24* (2006.01)

(52) U.S. Cl.
CPC ............ *H04L 45/22* (2013.01); *H04L 41/0896* (2013.01); *H04L 41/12* (2013.01)

(58) Field of Classification Search
None
See application file for complete search history.

(56) References Cited

U.S. PATENT DOCUMENTS

| | | | |
|---|---|---|---|
| 2003/0076849 A1* | 4/2003 | Morgan | H04L 12/4625 370/412 |
| 2005/0141433 A1* | 6/2005 | Allasia et al. | 370/252 |
| 2005/0259586 A1* | 11/2005 | Hafid | H04L 12/5695 370/241 |
| 2006/0205413 A1* | 9/2006 | Teague | H04L 5/0087 455/452.1 |
| 2006/0209678 A1* | 9/2006 | Vu et al. | 370/216 |
| 2007/0162903 A1* | 7/2007 | Babb et al. | 717/154 |
| 2007/0172237 A1* | 7/2007 | Risbood | 398/59 |

OTHER PUBLICATIONS

Cygan, Marek, et al., "Subset feedback vertex set is fixed parameter tractable", arXiv:1004.2972v2 [cs/DS] Nov. 3, 2010.*
Crainic T., et al., "Efficient Heuristics for the Variable Size Bin Packing Problem with Fixed Costs", Cirrelt-2010-18, Mar. 2010.*
Cheocherngngarn, Tosmate, et al., "Depth-First Worst-Fit Search based Multipath Routing for Data Center Networks", IEEE, 2012 Globecom, p. 2821-2826.*
Cheng, Kwang-Ting et al., "A Partial Scan Method for Sequential Circuits with Feedback", IEEE Transactions on Computers, vol. 39, No. 4, Apr. 1990.*
Wu; "A survey of WDM network reconfiguration: Strategies and triggering methods"; Computer Networks, No. 55; pp. 2622-2645, 2011.
Ahmed et al.; "Traffic Re-Optimized Strategies for Dynamically Provisioned WDM Networks"; Proceedings of ONDM; 6 pages, 2011.

(Continued)

*Primary Examiner* — Faruk Hamza
*Assistant Examiner* — Cassandra Decker
(74) *Attorney, Agent, or Firm* — Baker Botts L.L.P.

(57) ABSTRACT

A method for network analysis includes determining an initial set of demands upon the resources of a network, determining a new set of demands upon the resources of the network, apply a policy for assigning a demand of the new set of demands to a demand of the initial set of demands, create a dependency for the assignment of the demand of the new set of demands to the demand of the initial set of demands, construct a sub-graph including the dependency, and incorporate the sub-graph into a resource-oriented-dependency graph. Each demand includes a quantification.

30 Claims, 11 Drawing Sheets

(56) References Cited

OTHER PUBLICATIONS

Solano; "Analyzing Two Conflicting Objectives of the WDM Lightpath Network Reconfiguration Problem"; IEEE Globecom, 7 pages, 2009.

Jose et al.; "Connection Rerouting/Reconfiguration"; IEEE Design of Reliable Communication Networks (DRCN), p. 23-30, 2003.

* cited by examiner

US 9,391,875 B2

RESOURCE ORIENTED DEPENDENCY GRAPH FOR NETWORK CONFIGURATION

TECHNICAL FIELD OF THE INVENTION

The present invention relates generally to communication networks and, more particularly, to resource-oriented dependency graphs for network configuration.

BACKGROUND

Telecommunications systems, cable television systems and data communication networks may use networks to rapidly convey large amounts of information between remote points. Traffic may arrive and leave in various parts of such a network in dynamic fashion. Furthermore, the topology of such a network may change, and failure of portions of the network may occur. The requirements of a network may be expressed using graphs. Resource-oriented dependency graphs may illustrate a network node, a resource, and a need for use of the resource by the node.

SUMMARY

In one embodiment, a method for network analysis includes determining an initial set of demands upon the resources of a network, determining a new set of demands upon the resources of the network, apply a policy for assigning a demand of the new set of demands to a demand of the initial set of demands, create a dependency for the assignment of the demand of the new set of demands to the demand of the initial set of demands, construct a sub-graph including the dependency, and incorporate the sub-graph into a resource-oriented-dependency graph. Each demand includes a quantification.

In another embodiment, an article of manufacture includes a computer-readable medium and instructions carried on the computer-readable medium. The instructions are readable by a processor and, when loaded for execution by the processor, cause the processor to determine an initial set of demands upon the resources of a network, determine a new set of demands upon the resources of the network, each demand including a quantification, apply a policy for assigning a demand of the new set of demands to a demand of the initial set of demands, create a dependency for the assignment of the demand of the new set of demands to the demand of the initial set of demands, construct a sub-graph including the dependency, and incorporate the sub-graph into a resource-oriented-dependency graph. Each demand includes a quantification.

In yet another embodiment, an apparatus for network analysis includes a graph module and a control plane. The graph module is configured to determine a resource-oriented-dependency graph representing a change in dependency between an initial set of demands and a new set of demands upon the resources of a network, each demand including a quantification, determine one or more dependency cycles within the graph, and determine one or more demands within the graph to remove such that all dependency cycles within the graph are broken. The control plane is configured to reroute the determined one or more demands.

In still yet another embodiment, a method for network analysis includes determining a resource-oriented-dependency graph representing a change in dependency between an initial set of demands and a new set of demands upon the resources of a network, determining one or more dependency cycles within the graph, determining one or more demands within the graph to remove such that all dependency cycles within the graph are broken, and rerouting the determined one or more demands.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
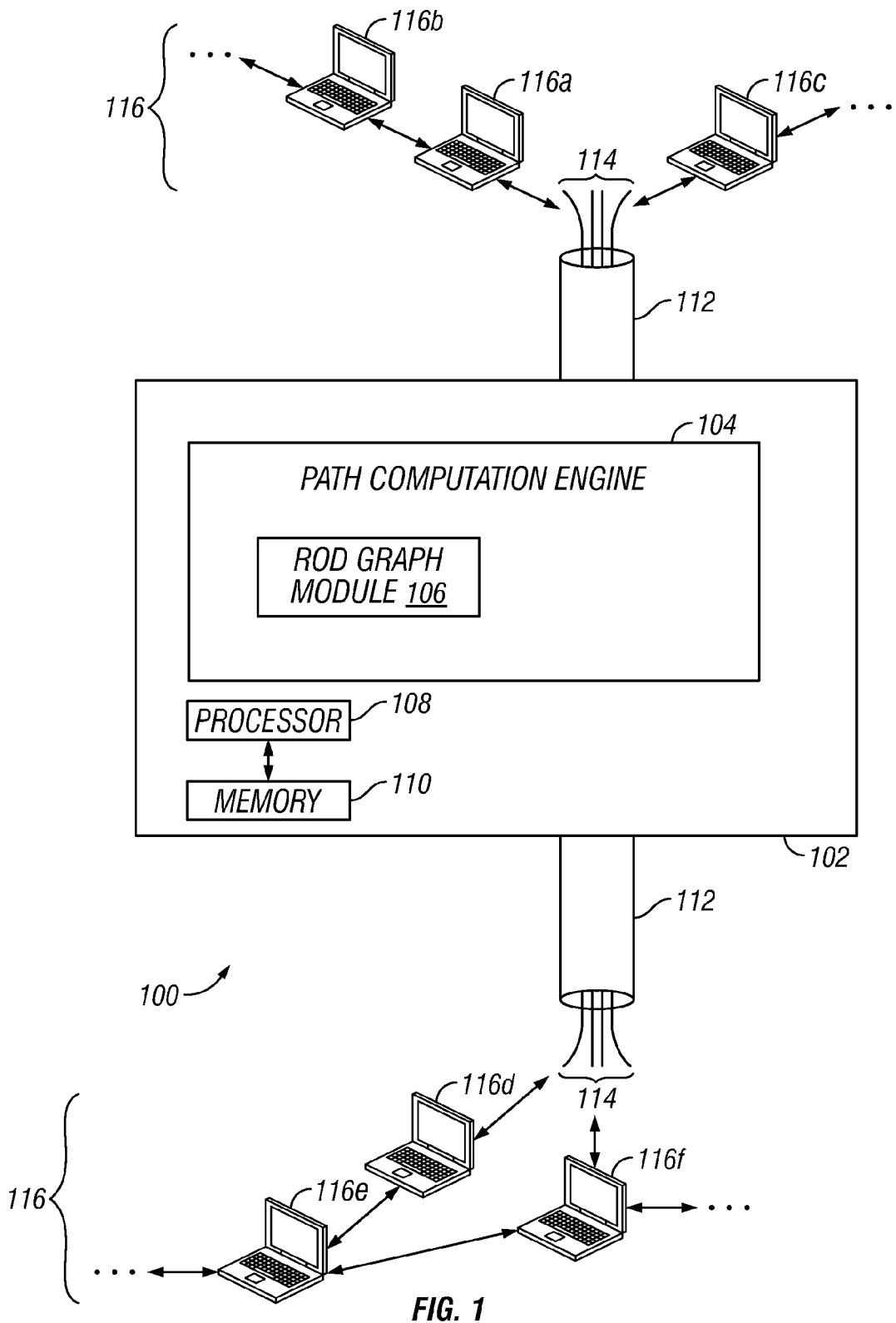
FIG. 1 illustrates an example embodiment of a system configured to provide resource-oriented dependency (ROD) graphs for a network.

FIG. 1 illustrates an example embodiment of a system 100 configured to provide resource-oriented dependency (ROD) graphs for a network. System 100 may be configured to provide such graphs within the context of network reconfiguration. Furthermore, system 100 may be configured to provide analysis based upon such ROD graphs.

System 100 may include an electronic device 102 configured to analyze network requirements and reconfiguration and to produce ROD graphs. Electronic device 102 may be configured to make such analysis and production in relation to other entities networked to electronic device 102, such as network nodes 116. Electronic device 102 and network nodes 116 may be communicatively coupled in any suitable manner, such as through a network, wide-area-network, local-area-network, an intranet, the Internet, or any combination thereof. Electronic device 102 may control access of a network link 112, which may include one or more available resources 114 that may be assigned to demands of network nodes 116. Resources 114 may include, for example, any suitable division of bandwidth or capacity. Resources 114 may be assigned to any suitable communication connection according to the protocols or services used by system 100, such as hyper-text transfer protocol, file transfer protocol, transport control protocol, Internet protocol, token-ring, or secured socket layer. Electronic device 102 may control access of network link 112 for network nodes 116, such that use of network link 112 by network nodes 116 may be determined by routes and assignments created by electronic device 102.

ROD graphs may be represented, for example, in memory by any suitable data structure configured to illustrate demands on resources and dependencies between such demands.

Electronic device 102 may be implemented in any suitable manner, such as by a computer, server, mobile device, router, blade, cloud computing device, embedded computer, control plane, or board. Electronic device 102 may include a processor 108 communicatively coupled to a memory 110.

Network nodes 116 may include, for example, producers or consumers of information that is to traverse network link 112. Network nodes 116 may have demands or needs of specific aspects of network link 112. For example, network nodes 116 may require a minimum amount of bandwidth or throughput for transmission of data to or from network nodes 116. The bandwidth or throughput may be defined in temporal terms such that a level of service is specified. Network nodes 116 may be implemented in any suitable manner, such as by a computer, server, mobile device, router, blade, cloud computing device, embedded computer, virtual machine, partition, or board. Although system 100 is illustrated with a single network link 112, system 100 and electronic device 102 may be configured to control any suitable number or kind of network links 112. Such network links 112 may include, for example, copper or twisted pair network links, fiber optic links, or wireless data links.

Electronic device 102 may include a path computation engine 104. Path computation engine 104 may be configured to determine, given demands from network nodes 116 and available capacity on network link 112, what access will be given to various network nodes 116 and how such access will be made. The determination of how access may be made may include a route through various intermediate network devices or paths that will be taken for network node 116 to access network link 112. Path computation engine 104 may be configured to reroute access to network link 112. Rerouting may be performed to better utilize the resources of system 100. Better utilization may be accomplished by, for example, minimizing resource usage to better accommodate additional traffic or to minimize conflicting demands that may block each other. Rerouting may be made upon, for example, upon a reconfiguration of the network topology of system 100, upon failure of an entity within the network of system 100, changing network traffic, at pre-defined instances in time or after the elapse of defined time periods, conflict in demands for network resources, reaching a threshold of network demands that are non-optimal, or reaching threshold performance metrics. Rerouting may include, for example, calculation of new paths by which network nodes 116 may utilize network resources.

For example, in FIG. 1 electronic device 102 may be coupled on a first end to network node 116a and to network node 116c. Network node 116a may in turn be coupled to network node 116b. Furthermore, electronic device 102 may be coupled on a second end to network node 116d and network node 116f. Network node 116d may in turn be coupled to network node 116e. In addition, network node 116f may in turn be coupled to network node 116e. Various ones of network nodes 116 may be coupled to other network nodes 116 (not shown).

Path computation engine 104 may be configured to determine connections between various of network nodes 116. For example, a connection may exist between network node 116b and network node 116e. Such a connection may be routed, for example, between network node 116b, network node 116a, electronic device 102, network node 116d, and network node 116e. In another example, the connection may be routed between network node 116b, network node 116a, electronic device 102, network node 116f, and network node 116e. Other connections may exist between, for example, network node 116d and network node 116e; or network node 116c, electronic device 102, and network node 116a. Each such connection may include associated demands for bandwidth along each segment of the connection route. Path computation engine 104 may be configured to change the specific entities through which a given connection is passed. Furthermore, path computation engine 104 may be configured allocate assignments of resources, such as bandwidth, to each segment of the connection route.

Path computation engine 104 may include a ROD graph module 106. ROD graph module 106 may be configured to assist the operation of path computation engine 104 in any suitable manner, such as analyzing the resource assignments of system 100. Furthermore, ROD graph module 106 may be configured to determine the order of demand rerouting and which demands by network nodes 116 may be interrupted. Such interruptions may be made before determining new paths or new routings.

Although ROD graph module 106 and path computation engine 104 are described as having particular functionality or configuration, in various embodiments the ROD graph module 106 may be configured to perform one or more aspects of path computation engine 104, and path computation engine 104 may be configured to perform one or more aspects of ROD graph module 106.

ROD graph module 106 and path computation engine 104 may be implemented in any suitable manner. For example, ROD graph module 106 and path computation engine 104 may be implemented by a control plane, library, function, shared library, executable, instructions, script, application, digital circuitry, analog circuitry, or any suitable combination thereof. ROD graph module 106 and path computation engine 104 may include instructions resident in memory 110 that, upon execution by processor 108, cause the operation as described in conjunction with ROD graph module 106 and path computation engine 104.

Processor 108 may comprise, for example a microprocessor, microcontroller, digital signal processor (DSP), application specific integrated circuit (ASIC), or any other digital or analog circuitry configured to interpret and/or execute program instructions and/or process data. In some embodiments, processor 108 may interpret and/or execute program instructions and/or process data stored in memory 110 to carry out some or all of the operation of electronic device 102. Memory 110 may be configured in part or whole as application memory, system memory, or both. Memory 110 may include any system, device, or apparatus configured to hold and/or house one or more memory modules. Each memory module may include any system, device or apparatus configured to retain program instructions and/or data for a period of time (e.g., computer-readable media). Memory 110 may be non-transitory. One or more portions or functionality of electronic device 102 may be implemented by the execution of instructions resident within memory 110 by processor 108.

Figure 2:
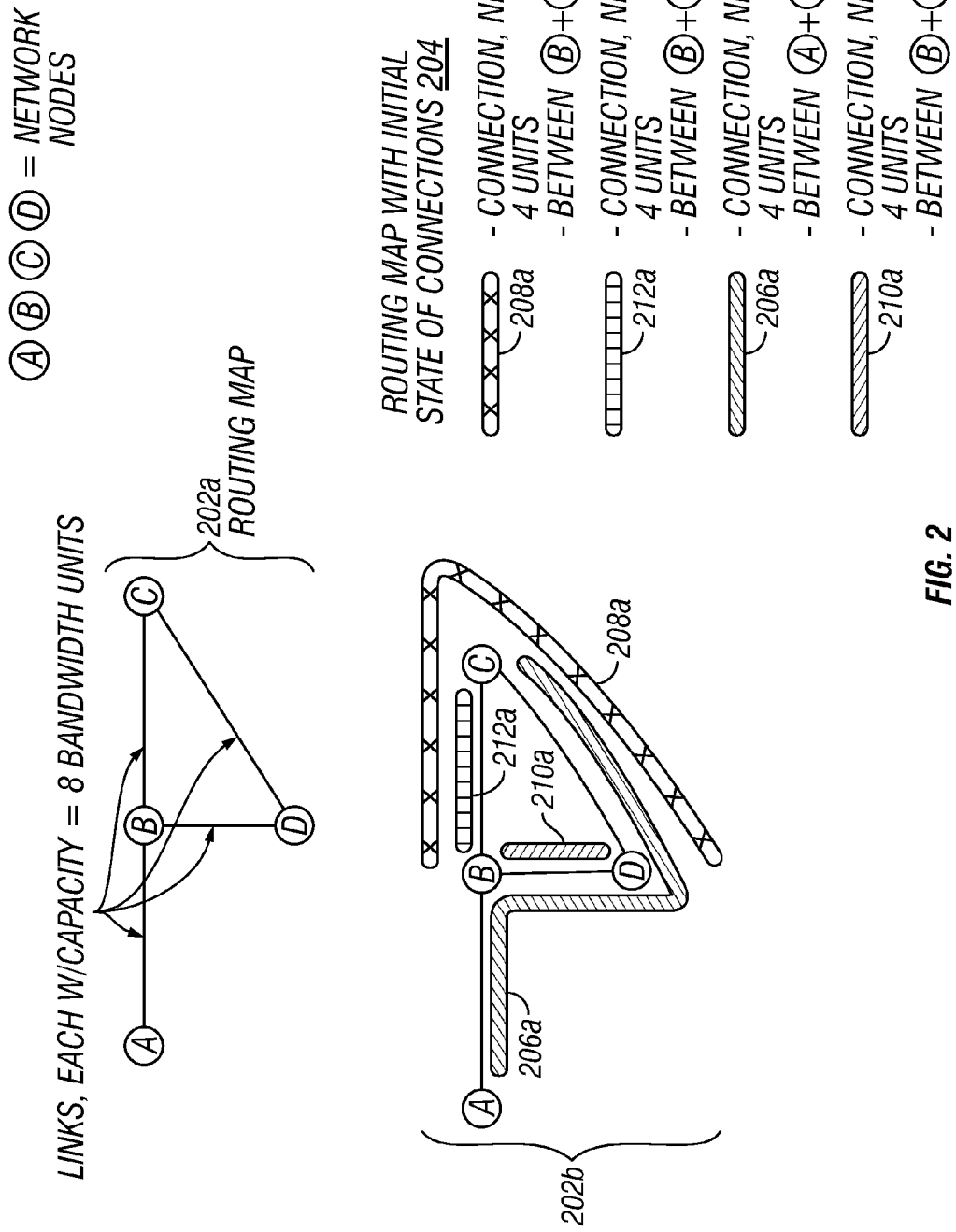
FIG. 2 is an illustration of example operation of an electronic device to create, maintain, and reroute or change routing maps.
Figure 2:
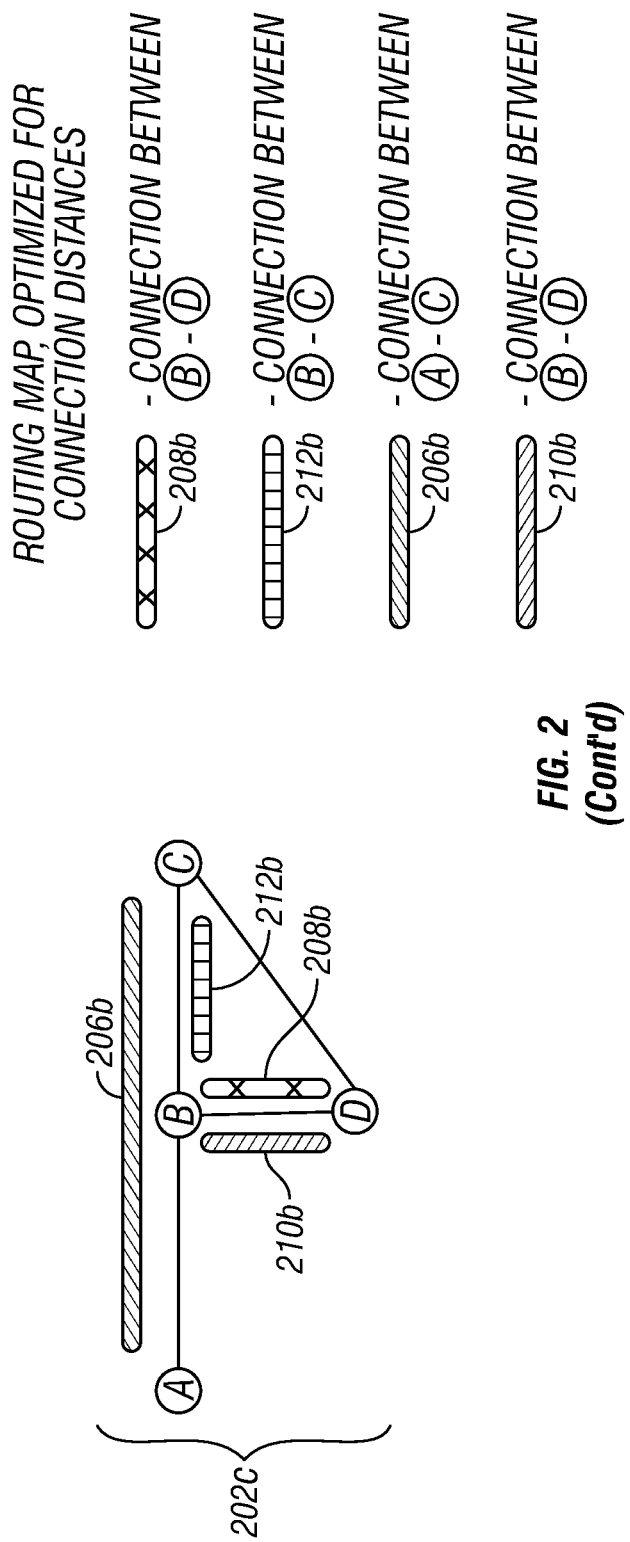

FIG. 2 is an illustration of example operation of electronic device 102 to create, maintain, and reroute or change routing maps 202. Routing maps 202 may illustrate the use of various network links between various network nodes (A), (B), (C), and (D). Such nodes may include, for example, network nodes 116. Such links may include, for example, network link 112. In the example of FIG. 2, each link between (A) and (B), (B) and (D), (B) and (C), and (C) and (D) may have a capacity of eight bandwidth units, respectively. Such units may be determined according to the specific application needs for electronic device 102 in utilizing routing maps 202. For example, a unit of bandwidth may be specified as one gigabit-per-second. Routing map 202a may illustrate the nodes and links without illustrating any specific end-to-end connections. Such an end-to-end connection may include, for example, an end-to-end connection between (A) and (D). In routing map 202a, such an end-to-end connection may be accomplished by, for example, routing from (A) to (B) to (D) or from (A) to (B) to (C) to (D). Nevertheless, routing map 202a may be silent with regards to the presence of such end-to-end connections. Furthermore, while links are illustrated between, for example (A) and (B), (B) and (D), (B) and (C), and (C) and (D), such illustrated links do not necessarily dictate that an end-to-end connection does exist between, for example (A) and (B), (B) and (D), (B) and (C), and (C) and (D). Such end-to-end connections may be possible but are not specified in routing map 202a. In addition, routing map 202a may illustrate the nodes and links without illustrating any specific demands utilizing such links. Such demands may be determined according to the end-to-end connections utilizing such links. For example, the aggregate bandwidth demand of each end-to-end connection passing through the links between a given one of the links between (A) and (B), (B) and (D), (B) and (C), and (C) and (D) are not necessarily shown in routing map 202a.

Routing map 202b illustrates the nodes and links with an initial state 204 of connections. Such connections may include, for example, a connection 206a from (A) to (C), a connection 208a from (B) to (D), a connection 210a from (B) to (D), and a connection 212a between (B) and (C). Connection 206a may be routed from (A) to (B) to (D) to (C) and may require four units of bandwidth capacity. Connection 208a may be routed from (B) to (C) to (D) and may require four units of bandwidth capacity. Connection 210a may be routed from (B) to (D) directly and may require four units of bandwidth capacity. Connection 212a may be routed from (B) to (C) directly and may require for units of bandwidth capacity.

Suitable portions of electronic device 102, such as ROD graph module 106 or path computation engine 104, may analyze routing map 202b and determine that the paths contained therein are suboptimal. For example, distances for connections 206a and 208a may be longer than necessary. In another example, connections 206a and 208a may utilize bandwidth that may be saved while still preserving the end-to-end communication of each. Accordingly, a rerouting may be triggered.

Routing map 202c may illustrate the nodes and links after being optimized for connection distances. Connection 208b may now be established directly between (B) and (D), as compared to connection 208a. Connection 206b may now be established from (A) to (B) to (C). Bandwidth between (D) and (C) may now be available for other uses. Thus, bandwidth may be freed as a result of optimizing routing for connection distances. Furthermore, routing map 202c may illustrate the nodes and links after being optimized for bandwidth usage. Such a bandwidth optimization may be made in consideration of the total bandwidth available across all such links, or across a specified subset of such links. For example, routing 202c may illustrate the nodes and links after being optimized for bandwidth usage between (D) and (C).

In other examples wherein different communication links include different capacities, rerouting may be performed to minimize bandwidth at the expense of longer links, or vice-versa.

Figures 3, 4:
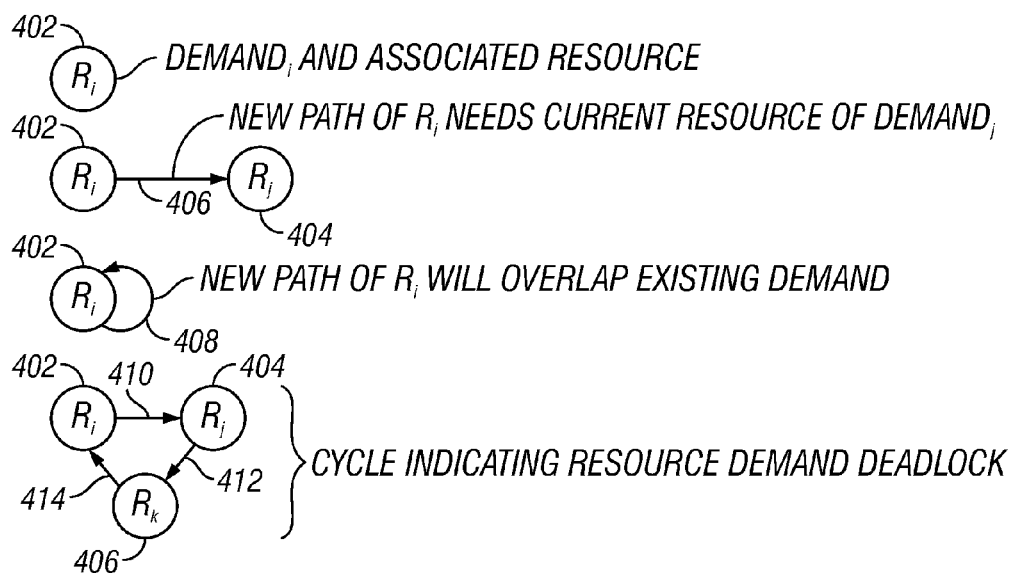
FIG. 3 is an illustration of the demand differences between two subsequent routing maps.
FIG. 4 is an illustration of the operation of an electronic device to produce ROD graphs.

FIG. 3 is an illustration of the demand differences between routing map 202b and routing map 202c. Connection 206, with $demand_0$, representing the demands of routing map 202b, and $demand_1$, representing the demands of routing map 202c, was reduced with respect to the number of connections necessary as well the routing distance and necessary bandwidth. Connection 208, with $demand_0$, representing the demands of routing map 202b, and $demand_1$, representing the demands of routing map 202c, was reduced with respect to the number of connections necessary as well the routing distance and necessary bandwidth. Connections 210 and 212 were maintained with respect to the number of connections necessary, the routing distance, and necessary bandwidth.

FIG. 4 is an illustration of example operation of electronic device 102 to produce ROD graphs. Graph node 402 illustrates a current demand i upon a particular resource. Such a demand may come from, for example, one of network nodes 116. The demand may be made of, for example, a portion of network link 112. Graph node 406 illustrates a new path of a resource demand, wherein a demand i needs the resource currently being used by another demand, j. Graph node 408 illustrates that a new mapping of a demand i (that is, its future need) will overlap its existing demand. Graph nodes 410, 412, 414 illustrate a cycle, wherein current demand i requires the resource currently used by demand j, which in turn will require the resource currently used by demand k, which in turn will require the resource currently used by demand i. Such a cycle may indicate a resource demand deadlock. Although such a cycle is illustrated with three demands, a cycle may include any number of intermediate demands with such cyclic dependency. The use of such graph nodes in FIG. 4 may be used to illustrate resource dependency as shown below.

Figure 5:
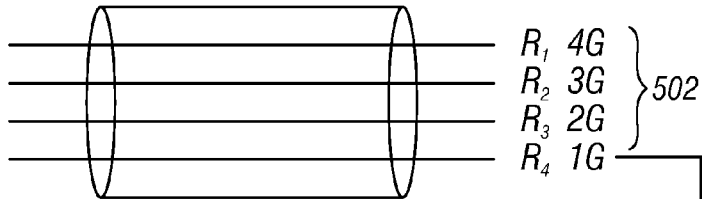
FIG. 5 is an illustration of demands of a network link.
Figure 5:
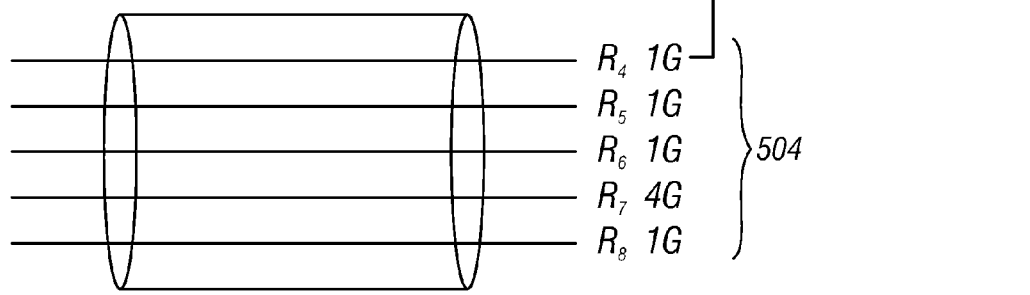
Figure 5:
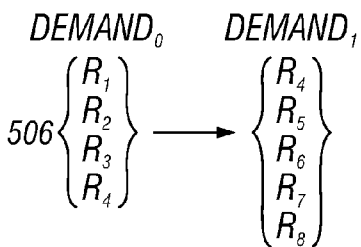
Figure 5:
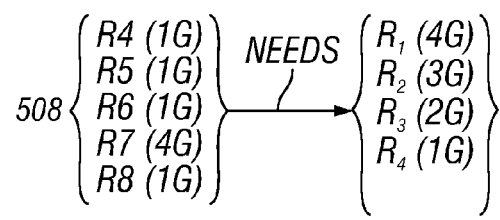

FIG. 5 is an illustration of demands of a network link. Such demands may include requirements originating from, for example, network nodes 116. Such a network link may include, for example, network link 112. Graph 502 may illustrate the demands of network link 112 at a first moment in time. For example, demands may include demands for resources for a four gigabit-per-second connection for R1, a demand for three gigabit-per-second connection for R2, a demand for two gigabit-per-second connection for R3, and a demand for one gigabit-per-second connection for R4.

Graph 504 may illustrate the demands of network link 112 at a second moment in time. Such a second moment in time may include an instance in which the demands upon network link 112 have changed, such as after an optimization as illustrated in FIG. 2 or other change. For example, demands may include a maintaining of the demand R4, a demand for resources for a one gigabit-per-second connection for R5, a demand for a one gigabit-per-second connection for R6, a demand for a four gigabit-per-second connection for R7, and a demand for a one gigabit-per-second connection for R8.

ROD graph module 106 may be configured to map the dependencies of the new demands shown in graph 504 against the previous demands shown in graph 502. In one embodiment, ROD module 106 may be configured to discard R4 from adding demands, since its demands are maintained in both instances of time. Graph 506 illustrates that the demands R1, R2, R3, R4 previously extant have been replaced by the set of demands R4, R5, R6, R7, and R8. Consequently, graph 508 illustrates the resource-oriented dependency of the set of new demands upon the resources occupied by the previous set of demands. The determination of which specific new demands are mapped to specific resources occupied by previous demands within graph 508 may be performed by, for example, ROD graph module 106.

Figure 6:
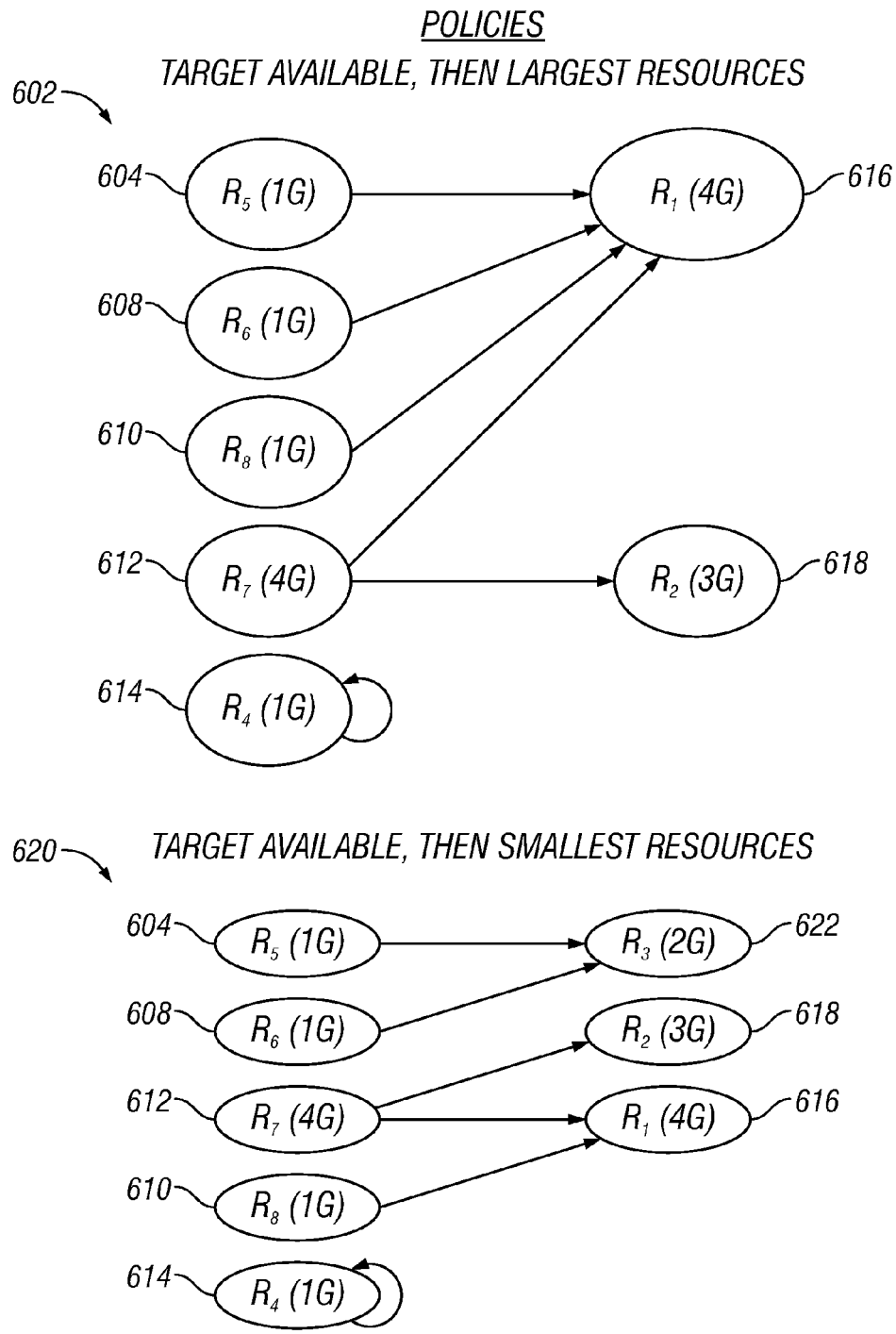
FIG. 6 is an illustration of example operation of a ROD graph module to determine how to map demands to the resources of previous demands within a ROD graph.
Figure 6:
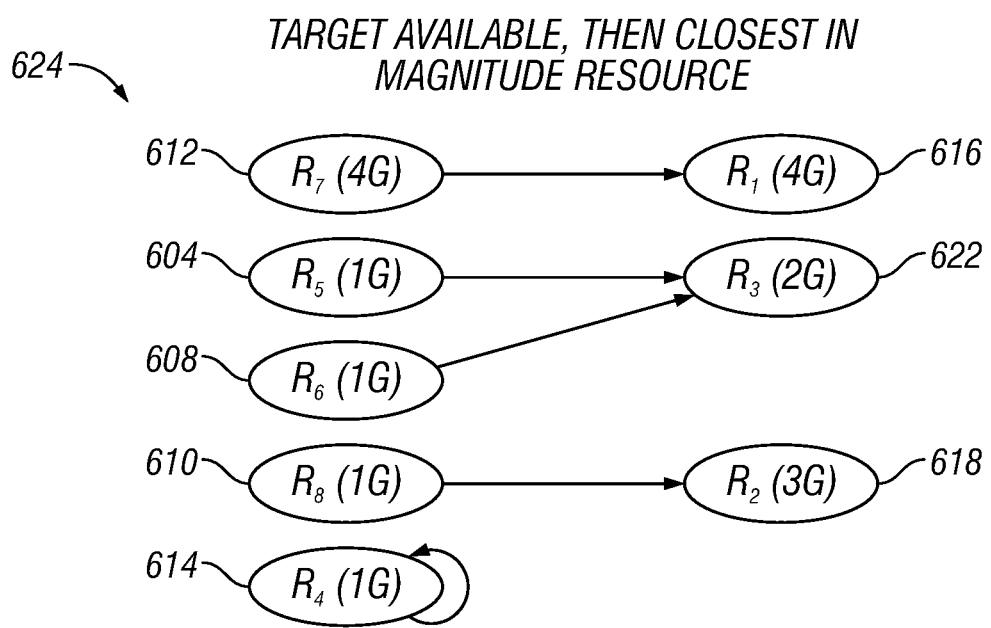

FIG. 6 is an illustration of example operation of ROD graph module 106 to determine how to map new demands to the resources of previous demands within a ROD graph. To perform such operation, ROD graph module 106 may employ any suitable policy or technique. For example, ROD graph module 106 may employ an available, then largest resources policy (policy 602); an available, then smallest resources policy (policy 620); or an available, then closest-in-magnitude policy (policy 624). Each of policies 602, 620, 624 illustrate example operation of ROD graph module 106 to determine how to map new demands to the resources of previous demands, such as the mapping illustrated in graph 508. Each of policies 602, 620, 624 may be implemented by a set of logic, rules, or other mechanisms of execution.

Policy 602 illustrates that, given a new set of demands and resources assigned to previous demands, new demands may be mapped to open—or previously unassigned—resources first, and then to resources occupied by the largest previous demand. For example, if the previously assigned demands included R1 616 with a four gigabit-per-second (G) allocation, R2 618 with a 3G allocation, R3 with a 2G allocation, and R4 with a 1G allocation, R1 includes the largest previous demand and thus the largest resource previously assigned to demands. ROD graph module 106 may be configured to assign new resource demands to R1 616 until its capacity is used by new resource demands, and then subsequently assign resource demands to R2 618, and so forth. For example, R5 604 (with a 1G requirement), R6 608 (with a 1G requirement), R8 610 (with a 1G requirement), and R7 612 (with a 4G requirement) may be assigned to R1 616. However, because the resource formerly held by R1 616 only has 4G capacity, R7 612 may also be assigned to R2 618, with a 3G capacity. Thus, policy 602 illustrates that demands R5, R6, R7, and R8 from graph 508 will share the resource occupied by R1, and that R7 will also utilize the resource occupied by R2. R4 614 may continue to utilize its assigned resource.

Policy 620 illustrates that, given a new set of demands and resources assigned to previous demands, the new set of demands may be mapped to open—or previously unassigned—resources first, and then to resources occupied by the smallest previous demand. For example, if the previously assigned demands included R1 616 with a four gigabit-per-second (G) allocation, R2 618 with a 3G allocation, R3 622 with a 2G allocation, and R4 614 with a 1G allocation, R3 622 includes the smallest previous demand and thus the smallest resource previously assigned to demands. R4 614 may be removed from consideration because the same resource demands existed before and after the change in graph. ROD graph module 106 may be configured to assign new resource demands to R3 622 until its capacity is used by new resource demands, subsequently assign resource demands to R2 618, and subsequently to R1 616. For example, R5 604 (with a 1G requirement) and R6 608 (with a 1G requirement) may be assigned to R3 622. Furthermore, R7 612 (with a 4G requirement) may be assigned to R2 618. However, because the resource formerly held by R2 618 only has 3G capacity, R7 may also be assigned to R1 616, with a 4G capacity. In addition, R8 610 (with a 1G requirement) may also be assigned to R1 616. Thus, policy 620 illustrates that demands R5 and R6 from graph 508 will share the resource occupied by R3, that demands R7 and R8 will share the resource occupied by R1, and demand R7 will occupy the resource occupied by R2. R4 614 may continue to utilize its assigned resource.

Policy 624 illustrates that, given a new set of demands and resources assigned to previous demands, the new set of demands may be mapped to open—or previously unassigned—resources first, and then to resources occupied by demands closest in match to a given new demand. For example, if the previously assigned demands included R1 616 with a 4G allocation, R2 618 with a 3G allocation, R3 622 with a 2G allocation, and R4 614 with a 1G allocation, then R1 616 includes the demand most closely matching R7 612. Furthermore, R3 622 includes the demand most closely matching R5 604 and R6 608. Leftover demands, such as R2 618 to R8 610, may be made according to need. Thus, policy 624 illustrates that demands R5 and R6 from graph 508 will share the resource occupied by R3, that demand R8 will occupy the resource occupied by R2, and demand R7 will occupy the resource occupied by R1. R4 614 may continue to utilize its assigned resource.

Figure 7:
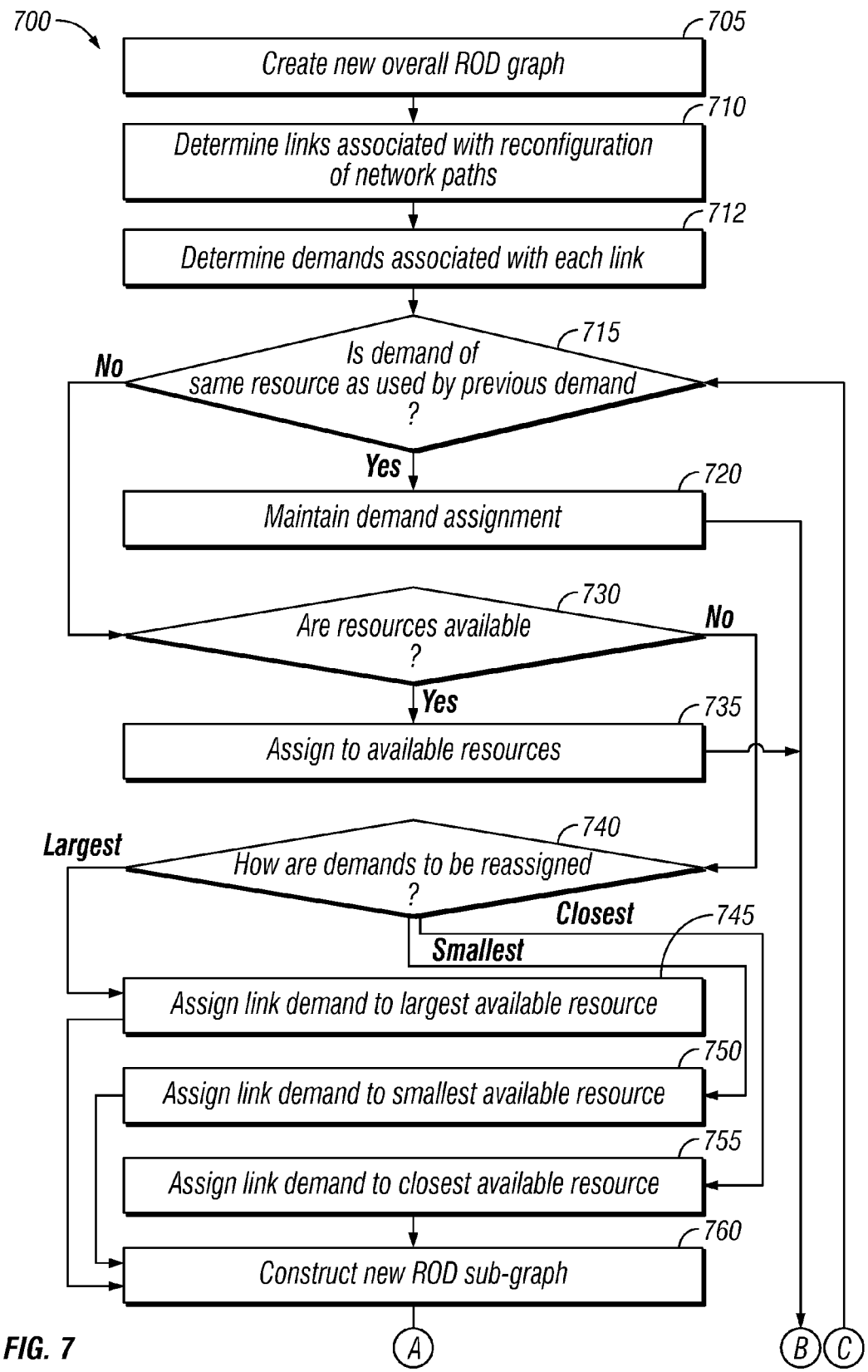
FIG. 7 is an illustration of an example embodiment of a method constructing a ROD graph given a change in demands.
Figure 7:
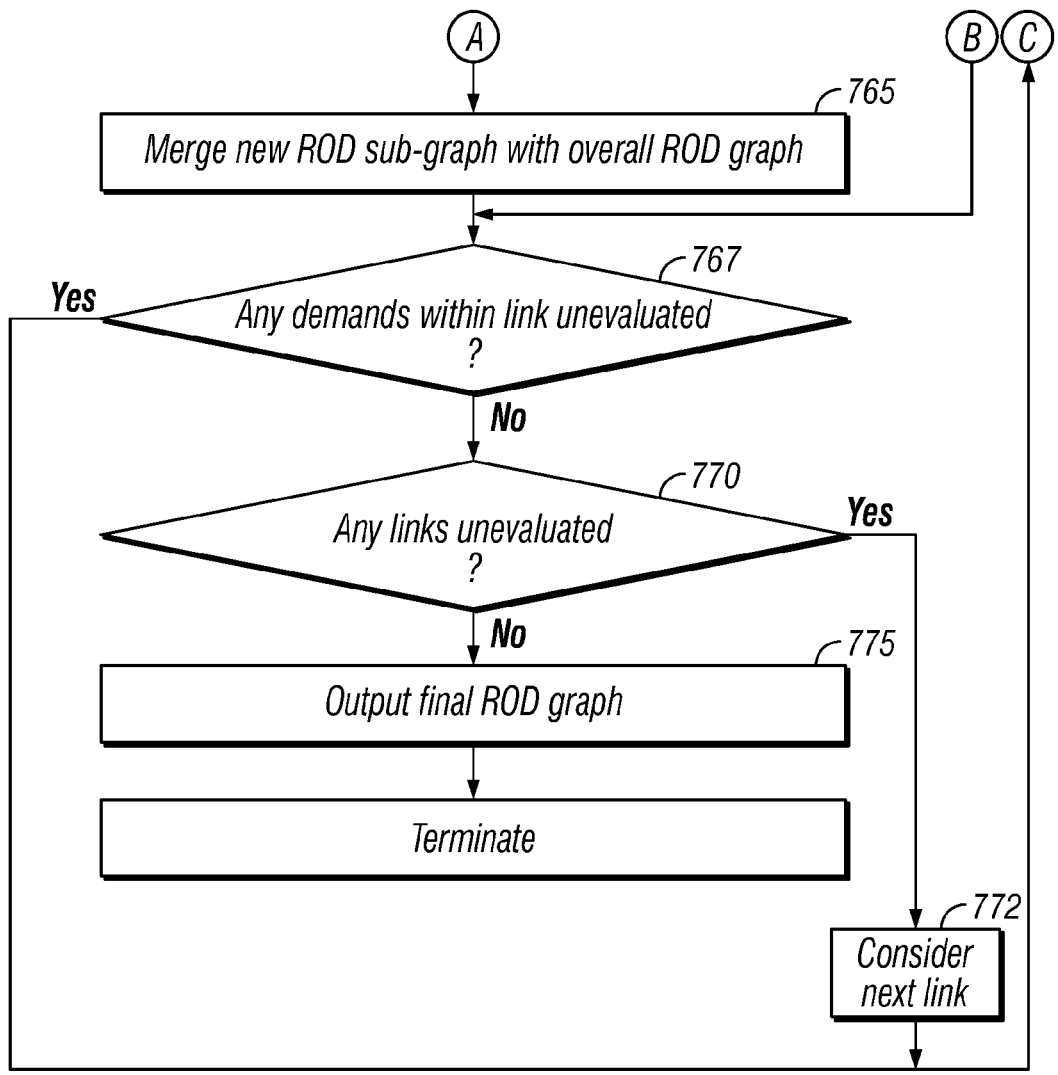

FIG. 7 is an illustration of an example embodiment of a method 700 for constructing a ROD graph given a change in demands. Method 700 may be implemented by, for example, ROD graph module 106 based upon a change in demands from network nodes 116 for resources of network link 112. Method 700, or portions thereof, may be repeated for each network link of a system.

In 705, an initial or starting ROD graph may be determined based on previous or existing usage. The new overall ROD graph may eventually include the merged graph of any sub-graphs generated during the operation of 700. Initially, the ROD graph may be empty. The demands of various network nodes and their connections may be mapped to the resources fulfilling the demands and they may be quantified. Furthermore, new sets of demands may be determined. Thus in 710, resources associated with a change in demand may be determined. For example, links associated with a reconfiguration of network paths may be determined. In 712, demands associated with each such link may be determined. The demands of each such link may be associated with a ROD sub-graph that is constructed using demand policies and may reflect demands associated with the respective links. Each such ROD sub-graph generated, as described below, may be added to the overall ROD graph. Evaluation of a given demand for a given link, described beginning at 715, may be repeated for each demand on the given link, and may be repeated for each determined link.

In 715, it may be determined whether, for a given demand of a given link, whether the a demand is of the same resource as previously used, or whether the demand represents a change in demands. If the demand of the same resource as previously used by the demand, then in 720 demand assignment may be maintained for the demand. Method 700 may proceed to 767. If the demand is not of the same resource, then method 700 may proceed to 730.

In 730, it may be determined whether resources are available and not previously assigned to demands. If so, in 735 such resources may be routed to demands, including the given demand. Method 700 may proceed to 767. If not, method 700 may proceed to 740.

In 740, it may be determined how demands are to be assigned, which may include prioritization. Such prioritization may utilize, for example, policies 602 (largest previous demand), 620 (smallest previous demand), or 624 (closest in magnitude previous demand). If a largest previous demand policy is to be used, method 700 may proceed to 745. If a smallest previous demand policy is to be used, 700 may proceed to 750. If a closest-in-magnitude demand policy is to be used, 700 may proceed to 755.

In 745, a given link demand may be assigned to the resource occupied by the largest demand that still has bandwidth available for reassignment. 745 may be repeated for each link demand until all demands for the link are assigned. Method 700 may proceed to 760.

In 750, a given link demand may be assigned to the resource occupied by the smallest demand that still has bandwidth available for reassignment. 750 may be repeated for each link demand until all demands for the link are assigned. Method 700 may proceed to 760.

In 755, a given link demand may be assigned to the resource occupied by the demand with the closest match in size that still has bandwidth available for reassignment. 755 may be repeated for each link demand until all demands for the link are assigned. Method 700 may proceed to 760.

In 760, new ROD sub-graphs may be constructed using the new dependencies assigned in 745-755. In 765, the new ROD sub-graph may be merged with the master ROD graph. In 767, it may be determined whether any other demands for the given link are unevaluated. If so, then method 700 may return to 715 to consider a next, unevaluated demand associated with the given link. If not, then method 700 may proceed to 770.

In 770, it may be determined whether any other links are unevaluated. If so, at 772 a next, unevaluated link may be considered and its associated demands determined. Method 700 may then return to 715 to evaluate a first demand of the given link. In 770, if all links have been evaluated, method 700 may proceed to 775. In 775, the final ROD graph may be output and method 700 may terminate.

Figure 8:
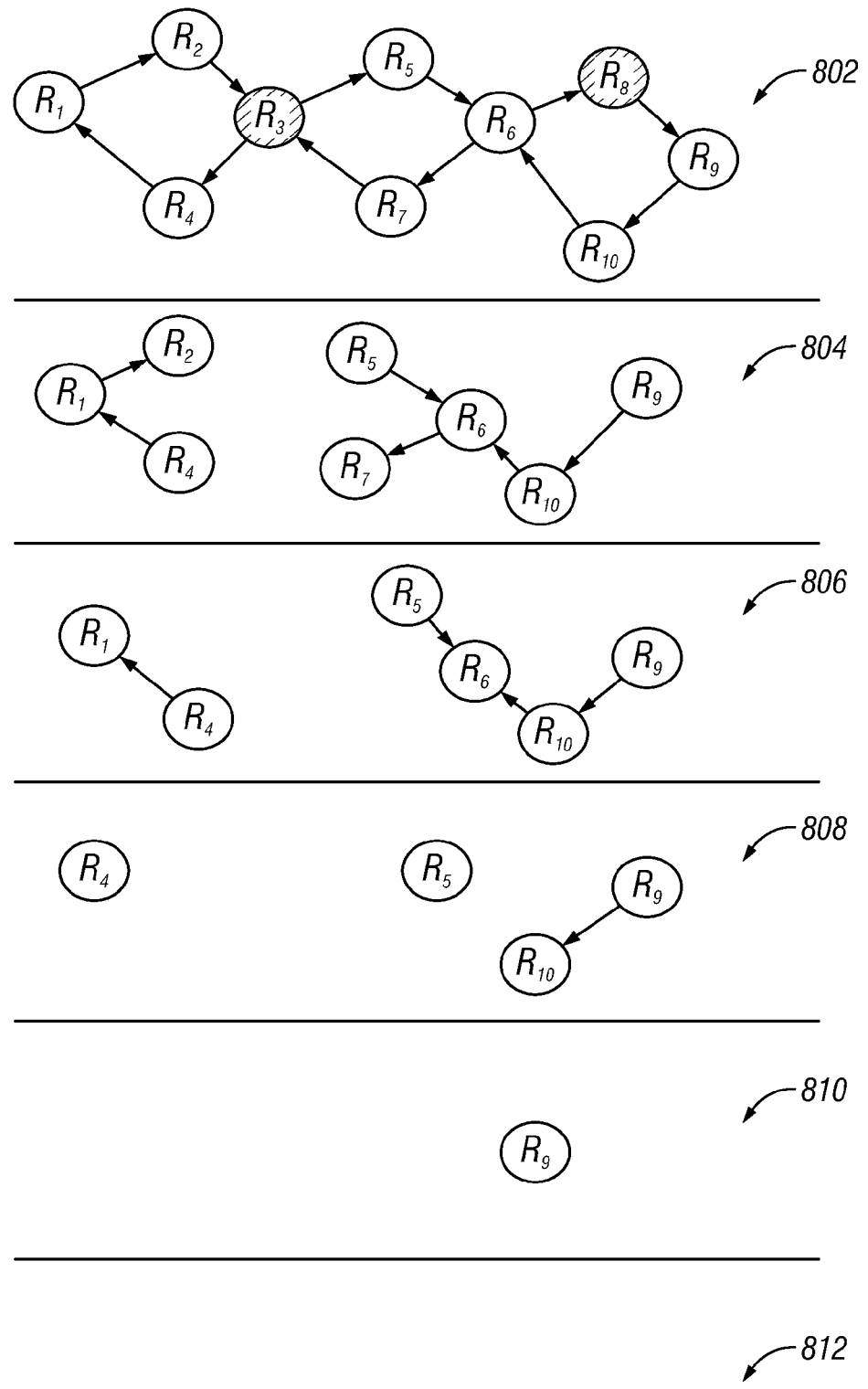
FIG. 8 is an illustration of example operation of a ROD graph module to determine how to disrupt and reroute demands.

FIG. 8 is an illustration of example operation of ROD graph module 106 to determine how to disrupt and reroute demands. As described above, cycles may occur within a ROD graph. ROD graph module 106 may disrupt demands and reroute demands in any suitable manner in a ROD graph. For example, in one embodiment ROD graph module 106 may disrupt cycles of a ROD graph by selecting for reroute or removal the fewest number of resource demands necessary to break the cycles. In another embodiment, ROD graph module 106 may determine which demands appear on the most cycles. Furthermore, ROD graph module 106 may allow such removed resource demands to execute and terminate through rerouting. In addition, ROD graph module 106 may iteratively reroute, or allow to complete, demands that do not depend on any other demand's resource and remove them, until no demands remain on the ROD graph.

For example, graph 802 illustrates a ROD graph containing dependency cycles. R3 and R8 may be selected for removal or rerouting, as their elimination from the graph will break the cycles. Selection of R3 and R8 may be the smallest number of demands for which removal will break all cycles of graph 802. R3 and R8 may be rerouted to other resources (not shown) or simply allowed to finish while other demands within graph 802 are held waiting.

Removal of R3 and R8 from graph 802 may yield graph 804. Demands that do not depend upon other resources may include, for example, R2 and R7. Thus, these demands may be rerouted to other resources (not shown) or allowed to finish while their dependents are held waiting. Rerouting may cause R2 and R7 to thus be removed from graph 804, resulting in graph 806.

Demands that do not depend upon other resources in graph 806 may include, for example, R1 and R6. Thus, these demands may be rerouted to other resources (not shown) or allowed to finish while their dependents are held waiting. Rerouting may cause R1 and R6 to thus be removed from graph 806, resulting in graph 808.

Demands that do not depend upon other resources in graph 808 may include, for example, R4, R5, and R10. Thus, these demands may be rerouted to other resources (not shown) or allowed to finish while their dependents are held waiting. Rerouting may cause R4, R5, and R10 to thus be removed from graph 808, resulting in graph 810.

In graph 810, R9 may be rerouted or allowed to finish and removed from graph 808, resulting in graph 812.

Figure 9:
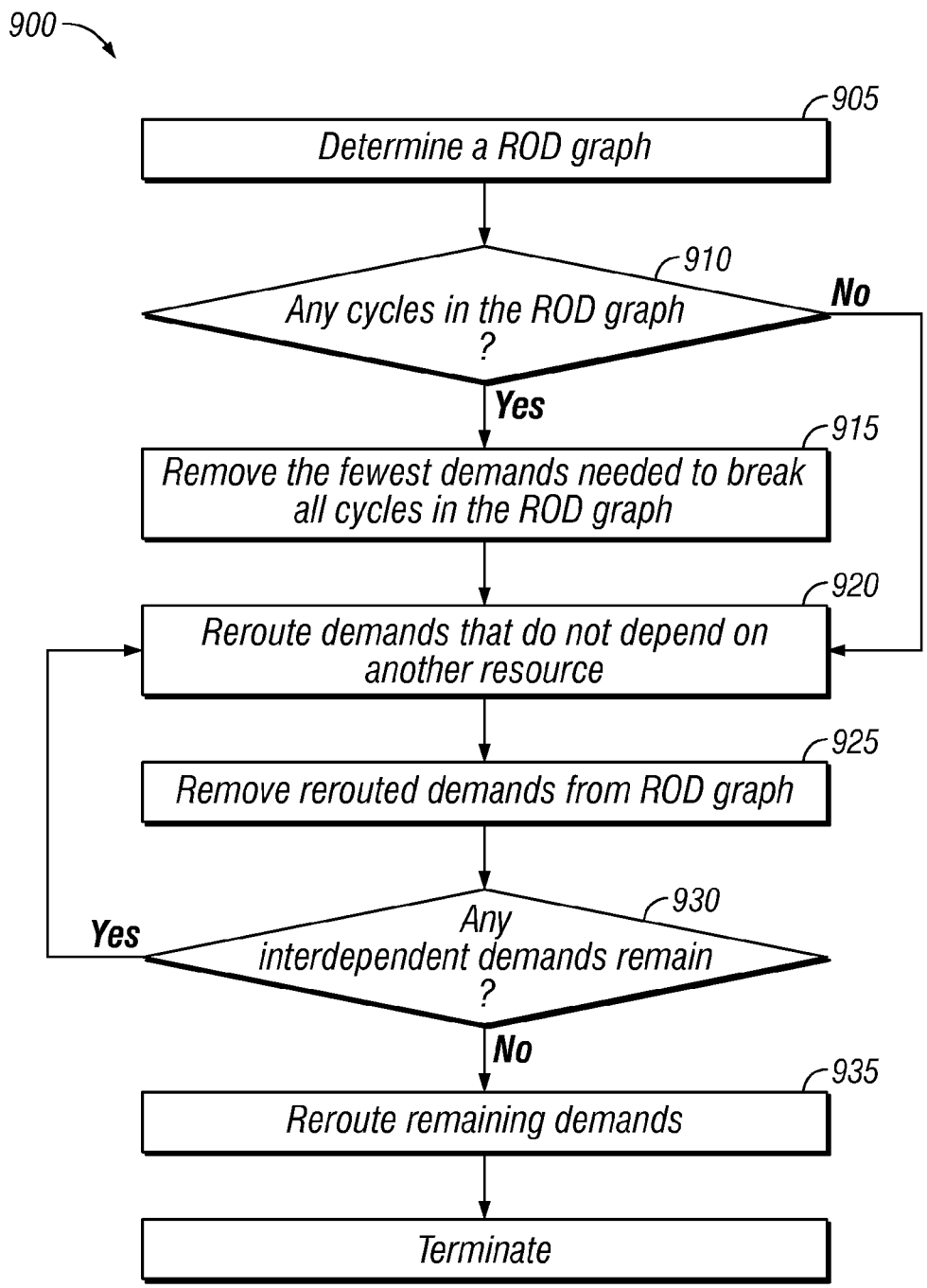
FIG. 9 is an illustration of an example embodiment of a method for determining how to disrupt and reroute demands.

FIG. 9 is an illustration of an example embodiment of a method 900 for determining how to disrupt and reroute demands. Method 900 may be performed by, for example, ROD graph module 106 upon a ROD graph, causing rerouting of demands from network nodes 116 of resources of network link 112.

In 905, a ROD graph may be determined. At 910, it may be determined whether any cycles exist in the ROD graph. If so, method 900 may proceed to 915. If not, method 900 may proceed to 920.

In 915, it may be determined which demand dependencies within the ROD graph may be removed in order to break the cycles of the ROD graph. In one embodiment, the fewest number of such demand dependencies necessary to break all cycles may be determined. In another embodiment, the demand dependencies appearing within the most number of cycles may be determined. These demand dependencies may be removed from the ROD graph. The dependencies may be rerouted to other resources or allowed to finish.

In 920, any demands that do not depend upon another resource may be rerouted to other resources or allowed to finish. The demands may be removed from the ROD graph in 925.

In 930, it may be determined whether any other interdependent demands remain. If not, then the remaining demands may be rerouted or allowed to finish. If so, then method 900 may proceed to 920. Method 900 may terminate.

Methods 700 and 900 may be implemented using the system or any portion thereof of FIGS. 1-6 and 8, or any other system or device operable to implement methods 700 and 900. As such, the preferred initialization point for methods 700 and 900 and the order of the steps comprising methods 700 and 900 may depend on the implementation chosen. In some embodiments, some steps may be optionally omitted, repeated, or combined. In certain embodiments, methods 700 and 900 may be implemented partially or fully in software embodied in computer-readable media.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as other tangible, non-transitory media; and/or any combination of the foregoing.

Although the present invention has been described with several embodiments, various changes and modifications may be suggested to one skilled in the art. It is intended that the present invention encompass such changes and modifications as fall within the scope of the appended claims.

What is claimed is:

1. A method for network analysis, comprising:
determining, with a graph module, an initial set of demands upon the resources of a network, each initial demand including a quantification of an amount of the respective initial demand;
determining, with the graph module, a new set of demands upon the resources of the network, each new demand including a quantification of an amount of the respective new demand;
applying, with the graph module, a policy for assigning a demand of the new set of demands to a demand of the initial set of demands, the policy being based at least upon the quantifications of the amounts of the respective initial demand and respective new demand, wherein, if the respective new demand is greater than the respective initial demand, a portion of the respective new demand is assigned to a next initial demand selected according to the policy;

creating, with the graph module, a dependency for the assignment of the demand of the new set of demands to the demand or the demands of the initial set of demands;

constructing, with the graph module, a sub-graph including the dependency; and incorporating, with the graph module, the sub-graph into a resource-oriented-dependency graph, wherein the demands upon the resources of the network are demands upon network links that comprise the network.

2. The method of claim 1, wherein the policy includes:
determining a largest demand from the initial set of demands;
assigning the demand of the new set of demands to the largest demand from the initial set of demands; and
when the demand of the new set of demands is larger than the largest demand from the initial set of demands, assigning the portion of the demand of the new set of demands to the next largest demand from the initial set of demands.

3. The method of claim 1, wherein the policy includes:
determining a smallest demand from the initial set of demands;
assigning the demand of the new set of demands to the smallest demand from the initial set of demands; and
when the demand of the new set of demands is larger than the smallest demand from the initial set of demands, assigning the portion of the demand of the new set of demands to the next smallest demand from the initial set of demands.

4. The method of claim 1, wherein the policy includes:
determining a matching demand from the initial set of demands most closely matching the demand of the new set of demands; and
assigning the demand of the new set of demands to the matching demand from the initial set of demands.

5. The method of claim 1, further comprising determining a change in configuration of the network, and wherein the new set of demands incorporates the change in configuration.

6. The method of claim 1, further comprising:
determining, with the graph module, one or more dependency cycles within the resource-oriented dependency graph;
determining, with the graph module, one or more demands within the resource-oriented dependency graph to be removed such that all dependency cycles within the resource-oriented dependency graph are broken, including determining which demand of the one or more demands is present on a largest number of dependency cycles within the resource-oriented dependency graph; and
rerouting, with a control plane, the determined one or more demands on the network.

7. The method of claim 6, further comprising removing the determined one or more demands from the resource-oriented dependency graph.

8. The method of claim 7, further comprising:
determining one or more remaining demands within the resource-oriented dependency graph that do not depend upon any other demands within the resource-oriented dependency graph; and
rerouting the determined remaining demands.

9. The method of claim 8, further comprising removing the determined remaining demands from the resource-oriented dependency graph.

10. The method of claim 9, further comprising repeating, until no demands remain in the resource-oriented dependency graph:
determining one or more remaining demands within the resource-oriented dependency graph that do not depend upon any other demands within the resource-oriented dependency graph;
rerouting the determined remaining demands; and
removing the determined remaining demands from the resource-oriented dependency graph.

11. An article of manufacture, comprising:
a non-transitory computer-readable medium;
instructions carried on the non-transitory computer-readable medium, the instructions readable by a processor and, when loaded for execution by the processor, cause the processor to:
determine an initial set of demands upon the resources of a network, each initial demand including a quantification of an amount of the respective initial demand;
determine a new set of demands upon the resources of the network, each new demand including a quantification of an amount of the respective new demand;
apply a policy for assigning a demand of the new set of demands to a demand of the initial set of demands, the policy being based at least upon the quantifications of the amounts of the respective initial demand and respective new demand, wherein, if the respective new demand is greater than the respective initial demand, a portion of the respective new demand is assigned to a next initial demand selected according to the policy;
create a dependency for the assignment of the demand of the new set of demands to the demand or the demands of the initial set of demands;
construct a sub-graph including the dependency; and
incorporate the sub-graph into a resource-oriented-dependency graph,
wherein the demands upon the resources of the network are demands upon network links that comprise the network.

12. The article of claim 11, wherein the policy includes instructions for causing the processor to:
determine a largest demand from the initial set of demands;
assign the demand of the new set of demands to the largest demand from the initial set of demands; and
when the demand of the new set of demands is larger than the largest demand from the initial set of demands, assign the portion of the demand of the new set of demands to the next largest demand from the initial set of demands.

13. The article of claim 11, wherein the policy includes instructions for causing the processor to:
determine a smallest demand from the initial set of demands;
assign the demand of the new set of demands to the smallest demand from the initial set of demands; and
when the demand of the new set of demands is larger than the smallest demand from the initial set of demands, assign the portion of the demand of the new set of demands to the next smallest demand from the initial set of demands.

14. The article of claim 11, wherein the policy includes instructions for causing the processor to:

determine a matching demand from the initial set of demands most closely matching the demand of the new set of demands; and assign the demand of the new set of demands to the matching demand from the initial set of demands.

15. The article of claim 11, further comprising instructions for causing the processor to determine a change in configuration of the network, and wherein the new set of demands incorporates the change in configuration.

16. The article of claim 11, further comprising instructions for causing the processor to:

determine one or more dependency cycles within the resource-oriented dependency graph;

determine one or more demands within the resource-oriented dependency graph to remove such that all dependency cycles within the resource-oriented dependency graph are broken, including determining which demand of the one or more demands is present on a largest number of dependency cycles within the resource-oriented dependency graph, wherein the control plane is configured to reroute the determined one or more demands.

17. The article of claim 16, further comprising instructions for causing the processor to:

remove the determined one or more demands from the resource-oriented dependency graph.

18. The article of claim 17, further comprising instructions for causing the processor to:

determine one or more remaining demands within the resource-oriented dependency graph that do not depend upon any other demands within the resource-oriented dependency graph; and reroute the determined remaining demands.

19. The article of claim 18, further comprising instructions for causing the processor to:

remove the determined remaining demands from the resource-oriented dependency graph.

20. The article of claim 19, further comprising instructions for causing the processor to, until no demands remain in the resource-oriented dependency graph:

determine one or more remaining demands within the resource-oriented dependency graph that do not depend upon any other demands within the resource-oriented dependency graph; and remove the determined remaining demands from the resource-oriented dependency graph; and reroute the determined remaining demands until no demands remain in the resource-oriented dependency graph.

21. An apparatus, comprising:

a non-transitory memory;

a processor communicatively coupled to the non-transitory memory;

instructions resident in the non-transitory memory, the instructions, when loaded and executed by the processor, configure the processor to:

determine an initial set of demands upon the resources of a network, each initial demand including a quantification of an amount of the respective initial demand;

determine a new set of demands upon the resources of the network, each new demand including a quantification of an amount of the respective new demand;

apply a policy for assigning a demand of the new set of demands to a demand of the initial set of demands, the policy being based at least upon the quantifications of the amounts of the respective initial demand and respective new demand, wherein, if the respective new demand is greater than the respective initial demand, a portion of the respective new demand is assigned to a next initial demand selected according to the policy;

create a dependency for the assignment of the demand of the new set of demands to the demand or the demands of the initial set of demands;

construct a sub-graph including the dependency; and incorporate the sub-graph into a resource-oriented-dependency graph, wherein the demands upon the resources of the network are demands upon network links that comprise the network.

22. The apparatus of claim 21, wherein the instructions further configure the processor to:

determine a largest demand from the initial set of demands;

assign the demand of the new set of demands to the largest demand from the initial set of demands; and when the demand of the new set of demands is larger than the largest demand from the initial set of demands, assign the portion of the demand of the new set of demands to the next largest demand from the initial set of demands.

23. The apparatus of claim 21, wherein the instructions further configure the processor to:

determine a smallest demand from the initial set of demands;

assign the demand of the new set of demands to the smallest demand from the initial set of demands; and when the demand of the new set of demands is larger than the smallest demand from the initial set of demands, assign the portion of the demand of the new set of demands to the next smallest demand from the initial set of demands.

24. The apparatus of claim 21, wherein the instructions further configure the processor to:

determine a matching demand from the initial set of demands most closely matching the demand of the new set of demands; and assign the demand of the new set of demands to the matching demand from the initial set of demands.

25. The apparatus of claim 21, wherein the instructions further configure the processor to determine a change in configuration of the network, and wherein the new set of demands incorporates the change in configuration.

26. The apparatus of claim 21, wherein the instructions further configure the processor to:

determine one or more dependency cycles within the resource-oriented dependency graph;

determine one or more demands within the resource-oriented dependency graph to remove such that all dependency cycles within the resource-oriented dependency graph are broken, including determining which demand of the one or more demands is present on a largest number of dependency cycles within the resource-oriented dependency graph, reroute the determined one or more demands.

27. The apparatus of claim 26, wherein the instructions further configure the processor to remove the determined one or more demands from the resource-oriented dependency graph.

28. The apparatus of claim 27, wherein the instructions further configure the processor to:

determine one or more remaining demands within the resource-oriented dependency graph that do not depend upon any other demands within the resource-oriented dependency graph; and reroute the determined remaining demands.

29. The apparatus of claim 28, wherein the instructions further configure the processor to remove the determined remaining demands from the resource-oriented dependency graph.

30. The apparatus of claim 29, wherein the instructions further configure the processor to, until no demands remain in the resource-oriented dependency graph:
- determine one or more remaining demands within the resource-oriented dependency graph that do not depend upon any other demands within the resource-oriented dependency graph; and
- remove the determined remaining demands from the resource-oriented dependency graph; and
- reroute the determined remaining demands until no demands remain in the resource-oriented dependency graph.

* * * * *